Sept. 25, 1962 R. P. DANIEL 3,055,231
SAFETY STEERING WHEEL
Filed May 9, 1960 2 Sheets-Sheet 1

ROGER P. DANIEL
INVENTOR.

BY J. R. Faulkner
J. J. Roethel
ATTORNEYS

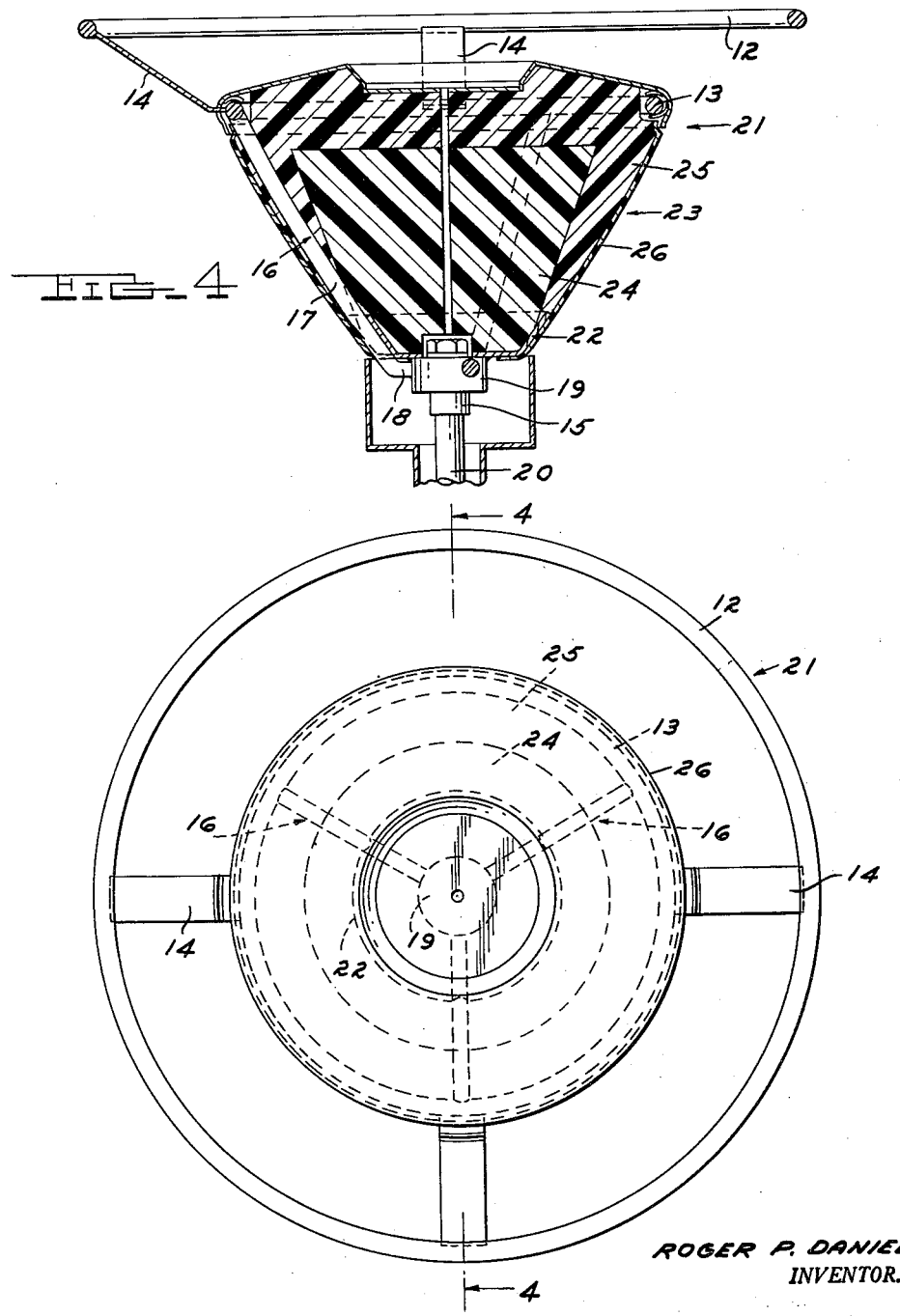

United States Patent Office 3,055,231
Patented Sept. 25, 1962

3,055,231
SAFETY STEERING WHEEL
Roger P. Daniel, Dearborn, Mich., assignor to Ford Motor Company, Dearborn, Mich., a corporation of Delaware
Filed May 9, 1960, Ser. No. 27,913
11 Claims. (Cl. 74—552)

This invention relates to steering wheels and more particularly to safety or impact energy absorbing steering wheels for automobiles.

The energy absorbing concept in the design of safety-type steering wheels, first used on a large scale on motor vehicles of the 1956 model year, was the result of observations which indicated that many fatal injuries sustained from driver contact with the steering wheel during collisions were caused by the crushing or penetration of the chest by the small area, rigid hub. The recessed hub steering wheel design was developed to provide collapsible distance between the rim and its supporting spoke structure and the hub. The substantial area of the rim opposing the driver's chest was relied upon to distribute any impact load to prevent localized high-pressure concentrations.

Statistics gathered since the introduction of the energy absorbing concept in safety steering wheels show that the recessed hub steering wheel has reduced the incidence of chest crushing injuries by half when compared to the previously used small hub, flat wheel design. However, the same data indicates that a proportionate reduction in the less severe injuries has not been effected. The conventional recessed hub steering wheels have a rigid hub area and a stiff rim which is supported by comparatively rigid spokes. With this design, lacerative or bruising injuries may be inflicted on the chest, face, neck or abdomen of the driver when the wheel is impacted at moderate speed. The flat-type steering wheels had a rim support that could be more easily deformed and thus provided a measure of energy absorbing capacity when impacted at low to moderate speeds. As a result, when the present safety-type steering wheel is evaluated only on the basis of reduction in critical-through-fatal injuries, its injury reducing advantages may be obscured since the preponderance of steering wheel injuries are in the range of minor-through-severe degrees.

It is an object of the present invention to provide further improvements in safety steering wheels. The improved steering wheels are constructed and arranged to reduce the incidence of the less serious injuries which occur in the majority of automobile accidents while at the same time providing a higher level of protection against crushing and penetrating injuries than is provided by the recessed hub steering wheel.

The present invention embodies a two-stage collapsible steering wheel having its attachment hub recessed substantially below the plane of the outer rim. The base of a central cone-like structure, the small end of which terminates at the attachment hub, provides an impact surface concentric with but recessed below the plane of the outer rim of the wheel. Short spokes connect the outer rim to the base of the impact cone. The spokes, which are designed and disposed to provide the steering wheel structure with the requisite torsional stiffness for steering the vehicle, deform under low pressure to allow axial displacement of the wheel rim during an impact. Since relatively low force can collapse the steering wheel rim out of the way during an impact, the potential for injury to the face, neck or abdomen is minimized. With the steering wheel rim displaced axially, the frontal area of the driver's rib cage is supported by the base of the impact cone structure. By this means, the impact loading is distributed over a substantial chest area and results in low unit contact pressure. The impact cone structure is designed to collapse progressively as the magnitude of the applied loading increases. Because the curved chest comes into contact with the base of the cone as soon as the steering wheel rim begins to collapse, the total depth of the cone structure provides effective energy absorbing distance above the attachment hub.

Other objects, advantages and features of this invention will be made more apparent as this description proceeds, particularly when considered in connection with the accompanying drawings, wherein:

FIG. 3 is a plan view illustrating a second embodiment of the present invention; and FIG. 4 is a sectional view taken substantially on the line 4—4 of FIG. 3 looking in the direction of the arrows.

Figure 2:
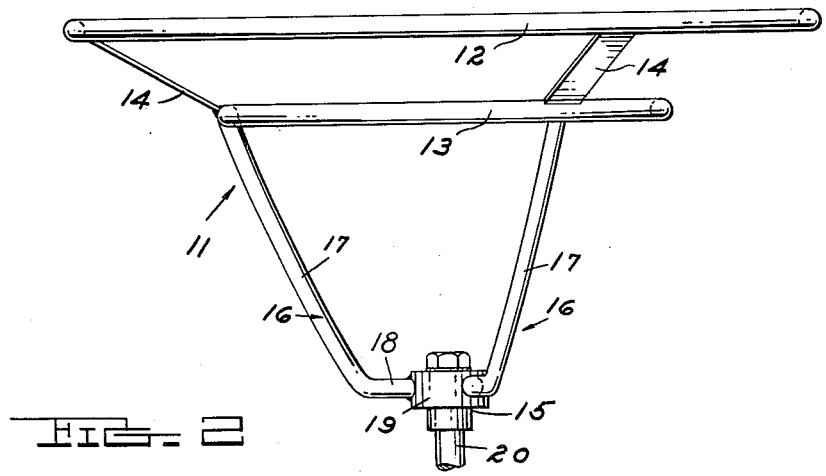
FIG. 2 is a side elevational view of FIG. 1.
Figure 1:
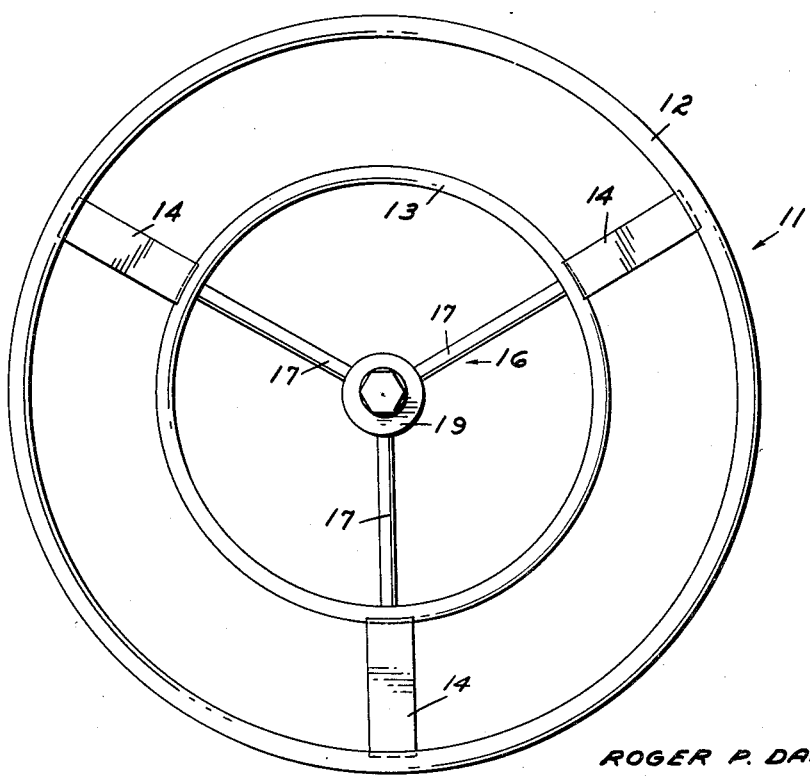
FIG. 1 is a plan view of a steering wheel incorporating the principles of the present invention.

Referring now to the drawings and particularly to FIGS. 1 and 2, the reference character 11 designates generally a steering wheel. The steering wheel 11 comprises an annular rim 12 concentrically supported on a smaller diameter annular member 13 by a plurality of short, flat, spring steel spokes 14. Preferably, there are three such spokes 14 and they may be equally spaced as shown in FIG. 2 or otherwise located, as will be described with reference to FIG. 4.

The annular member 13 forms the base of an inverted impact cone, the small end of which terminates in an attachment hub 15. The annular member 13 is supported on a plurality of spokes 16, which are preferably three in number and equally spaced. The spokes 16 are preferably of circular cross section and have an elongated downwardly extending and slightly inwardly curved main portion 17 terminating in a short horizontal leg portion 18. The short leg portions 18 preferably are received in suitable apertures (not shown) in a collar portion 19 of the attachment hub 15. The spokes are welded or otherwise securely attached to the collar portion 19.

As will be readily understood, the attachment hub 15 is adapted to be coupled, as by a spline connection (not shown), to the upper end of the steering shaft 20 in any conventional manner.

The foregoing construction and arrangement provides a two-stage collapsible steering wheel. The spring steel spokes 14 provide the necessary torsional stiffness so that the vehicle may be steered in the conventional manner by grasping the annular rim 12. However, it will be readily apparent that the spokes 14 will permit the outer rim to move under body impact axially downwardly or toward the hub 15. The force required to cause such movement is relatively low, although somewhat greater than the axial component of the force normally exerted against the wheel in steering the vehicle. With the steering rim displaced axially, the frontal area of the driver's rib cage is supported by the base of the impact cone structure, that is, the driver's rib cage will come in contact with the annular rim or member 13 while also resting against the rim 12. By this means, the impact loading is distributed over substantial chest area and results in low unit contact pressure. The construction and arrangement of the impact cone structure is such that it collapses progressively as the magnitude of the applied loading increases. Because the curved chest comes into contact with the impact cone base 13 as soon as the steering wheel rim begins to collapse, the total depth of the cone structure, as measured between the annular member 13 and the attachment hub 15, is effective energy absorbing distance above the attachment hub.

Since the outer rim is deflected out of the way with a relatively low impact force, the possibility of injury inflicting, localized, high pressure contact with vulnerable body areas, such as the face, neck or abdomen, is minimized. The principal energy absorbing capacity of the wheel normally will be distributed over a body area, the chest area, which is most capable of supprting a load without serious injury.

It will be understood that the rim 12 and other parts of the steering wheel 11 may be covered with suitable plastic or rubberized materials, as desired, to improve the ornamental appearance of the steering wheel as a whole and the gripping qualities of the rim 12.

The embodiment of the invention illustrated in FIGS. 3 and 4 carries the energy absorbing concept of the present invention a step further. In this embodiment, the steering wheel, generally designated 21 has essentially the same armature or frame structure as in the above-described embodiment. To this is added an upwardly opening sheet metal cup 22 which is positioned within the spokes 16 at the hub end 15 of the central or impact cone structure. The cup provides a base for an inverted frustum-shaped plastic foam hub pad 23. The hub pad 23 is preferably molded of two different types of plastic. As best seen, in FIG. 3, the hub pad 23 comprises an inner frustum-shaped core portion or insert 24 which is molded of relatively stiff, energy absorbing plastic foam. This insert is preferably premolded and then positioned in the center of the hub. To complete the hub pad 23, the insert 24 is preferably coated with a suitable adhesive. Then the steering wheel 21, with the insert 24 in place, is placed in a suitable mold and a soft plastic material is molded around the spokes and over the insert to form a soft cushion 25. The entire impact cone structure including the plastic hub pad may then be covered with a formed, sheet plastic ornamental cover 26.

It will be noted that the spokes 14 of the steering wheel 21 are positioned so that two horizontal spokes and only one vertical spoke is provided (see FIG. 3). As was noted with respect to the earlier described embodiment, the placement of the spokes may be as desired.

It will be readily apparent that the plastic foam hub pad 23 provides further energy absorbing structure over and above that provided by the impact cone. This further tends to minimize the possibility of injury inflicting, localized, high pressure contact with vulnerable body areas. The soft plastic outer material is particularly effective in minimizing soft tissue contact injury. The energy absorbing insert cooperates with the base of the impact cone structure to distribute the impact loading over a substantial chest area to result in low unit contact pressure.

It will be understood that the invention is not to be limited to the exact construction shown and described, but that various changes and modifications may be made without departing from the spirit and scope of the invention as defined in the appended claims.

I claim:

1. A safety steering wheel comprising a rim, a hub, an annular member concentric with and interposed between said rim and hub, first spoke means connecting said rim to said annular member, and second spoke means connecting said annular member to said hub, said first spoke means being constructed and arranged to resiliently support said rim for movement toward said hub under impact load, said first and second spoke means being angularly disposed relative to the plane of said annular member, said second spoke means being constructed and arranged to collapse with energy absorbing effect under an impact load in excess of that causing movement of said rim into substantially coplanar relationship with said annular member.

2. A safety steering wheel collapsible in two stages under an impact load, said steering wheel comprising a rim, an anular member, a first spoke means supporting said rim on said annular member in non-coplanar relationship thereto, said first spoke means being constructed and arranged to resiliently resist movement of said rim toward a coplanar relationship with said annular member to provide the first stage of collapse of said steering wheel under an impact load; a hub, and a second spoke means supporting said annular member on said hub, said second spoke means being constructed and arranged to provide the second stage of collapse of said steering wheel, said second spoke means being deformably collapsible with progressively increasing resistance to movement of said annular member toward said hub to provide energy absorbing effect under an impact load exerted on said annular member in excess of that causing said first stage collapse of said rim supporting spoke means into substantially coplanar relationship with said annular member.

3. A two-stage collapsible steering wheel comprising a rim, a hub, and an impact energy absorbing structure interposed between said rim and hub, said impact energy absorbing structure comprising an annular member and elongated spoke means connecting said annular member to said hub, short spoke means connecting said rim to said annular member, said short spoke means being resilient in a direction axially of said steering wheel, the longitudinal axes of said short spoke means intersecting the planes of said rim and annular member at a substantially flat angle whereby said spoke means normally maintain said rim in noncoplanar relation above said annular member, said rim being movable toward substantially coplanar relationship with said annular member under an impact load, such rim movement providing the first stage of collapse of said steering wheel, said elongated spoke means being deformable with progressively increasing resisance to an impact load applied to said steering wheel in excess of that causing said first stage collapse and transmitted to said elongnated spokes through said annular member, the deformation of said elongated spoke means providing the second stage of collapse of said steering wheel.

4. A two-stage collapsible steering wheel comprising a rim, a hub, and an impact energy absorbing structure interposed between said rim and hub, said impact energy absorbing structure comprising an annular member and elongated spoke means connecting said annular member to said hub, short spoke means connecting said rim to said annular member, said short spoke means being resilient in a direction axially of said steering wheel, the longitudinal axes of said short spoke means intersecting the planes of said rim and annular member at a substantially flat angle whereby said spoke means normally maintain said rim in noncoplanar relation above said annular member, the axial distance between said hub and annular member being substantially greater than the axial distance between said annular member and said rim, said rim being movable toward substantially coplanar relationship with said annular member under an impact load, such rim movement providing the first stage of collapse of said steering wheel, said elongated spokes means being deformable with progressively increasing resistance to an impact load applied to said steering wheel in excess of that causing said first stage collapse and transmitted to said elongated spokes through said annular member, the deformation of said elongated spoke means providing the second stage of collapse of said steering wheel.

5. A safety steering wheel comprising a rim, a hub, an annular member concentric with said hub, axially resilient spoke means having short spokes supporting said rim on said annular member in noncoplanar relationship thereto, the longitudinal axes of said short spokes intersecting the planes of said rim and annular member at a relatively flat angle, and elongated substantially rigid spoke means connecting said annular member to said hub, the axial distance between said hub and annular member being substantially greater than the axial distance between said annular member and rim.

6. A two-stage collapsible steering wheel comprising a rim, a hub, and an inverted impact cone structure having its large diameter end axially spaced from said hub and its small diameter end attached to said hub, spoke means connecting said rim to said large diameter end of said cone structure, said spoke means being constructed and arranged to be torsionally stiff and axially resilient relative to the axis of said steering wheel, said spoke means normally maintaining said rim in noncoplanar relationship to the large diameter end of said cone structure but permitting axial movement of said rim into substantially coplanar relationship with said large diameter end of said cone structure under an axially applied impact load to provide the first stage of collapse of said steering wheel, said impact cone structure being constructed and arranged to collapse with increasing resistance to an impact load applied to its large diameter end in excess of that causing said first stage collapse to provide the second stage of collapse of said wheel.

7. A two-stage collapsible steering wheel comprising a rim, a hub, and an inverted hollow impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement of said rim into substantially coplanar relationship with said large diameter end of said cone structure under an axially applied impact load to provide the first stage of collapse of said steering wheel, said impact cone structure being constructed and arranged to collapse with increasing resistance to an impact load applied to its large diameter end in excess of that causing said first stage collapse to provide the second stage of collapse of said wheel, and a hub pad of compressible energy absorbing material mounted within said hollow impact cone structure to assist the latter in absorbing second stage collapsing impact load.

8. A two-stage collapsible steering wheel comprising a rim, a hub, and an inverted hollow impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement of said rim into substantially coplanar relationship with said large diameter end of said cone structure under an axially applied impact load to provide the first stage of collapse of said steering wheel, said impact cone structure being constructed and arranged to collapse with increasing resistance to an impact load applied to its large diameter end in excess of that causing said first stage collapse to provide the second stage of collapse of said wheel, and a hub pad mounted substantially within said hollow impact cone structure, said hub pad comprising a core of relatively stiff energy absorbing plastic foam material.

9. A two-stage collapsible steering wheel comprising a rim, a hub, and an inverted hollow impact cone structure having its large diameter end axially spaced from said hub and its small diameter end attached to said hub, spoke means connecting said rim to said large diameter end of said cone structure, said spoke means being constructed and arranged to be torsionally stiff and axially resilient, said spoke means normally maintaining said rim in noncoplanar relationship to the large diameter end of said cone structure but permitting axial movement of said rim into substantially coplanar relationship with said large diameter end of said cone structure under an axially applied impact load to provide the first stage of collapse of said steering wheel, said impact cone structure being constructed and arranged to collapse with increasing resistance to an impact load applied to its large diameter end in excess of that causing said first stage collapse to provide the second stage of collapse of said wheel, and a hub pad mounted substantially within said hollow impact cone structure, said hub pad comprising a core of relatively stiff energy absorbing plastic foam material, said core being covered by a cushion layer of soft plastic material.

10. A two-stage collapsible steering wheel comprising a rim, a hub, and an impact energy absorbing structure interposed between said rim and hub, said impact energy absorbing structure comprising an annular portion concentric with said rim and said hub, a first axially resilient means supporting said rim on said annular portion in noncoplanar relationship therewith for movement toward substantially coplanar relationship with the annular portion under an impact load, such rim movement providing the first stage of collapse of said steering wheel, a second axially resilient means supporting said annular portion in noncoplanar relationship with said hub for movement toward substantially coplanar relationship with the hub under an impact load applied to said annular portion in excess of that causing said first stage of collapse to provide a second stage of collapse of said steering wheel.

11. A two-stage collapsible steering wheel comprising a rim, a hub, and an impact energy absorbing structure interposed between said rim and hub, said impact energy absorbing structure having an annular portion axially interposed between said rim and said hub, said impact energy absorbing structure having an annular portion axially interposed between said rim and said hub, the axial distance between said hub and the annular portion being substantially greater than the axial distance between said annular portion and said rim, a first axially resilient means supporting said rim on said annular portion for movement to a substantially coplanar relationship with the latter under an impact load, such rim movement providing a first stage of collapse of said steering wheel, a second axially resilient means supporting said annular portion on said hub for movement of said annular portion to a substantially coplanar relationship with the hub under an impact load applied to said annular portion in excess of that causing said first stage of collapse to provide a second stage of collapse of said steering wheel, such movement of said annular portion providing a progressively increasing resistance to the impact load.

References Cited in the file of this patent

UNITED STATES PATENTS

| | | |
|---|---|---|
| 2,166,290 | Geyer | July 18, 1939 |
| 2,639,626 | Snyder | May 26, 1953 |
| 2,683,383 | Schmid | July 13, 1954 |
| 2,894,413 | Schmid | July 14, 1959 |
| 2,899,214 | D'Antini | Aug. 11, 1959 |
| 2,913,924 | Pratt | Nov. 24, 1959 |
| 2,946,869 | Parks et al. | July 26, 1960 |

FOREIGN PATENTS

| | | |
|---|---|---|
| 653,358 | France | Nov. 8, 1928 |
| 848,458 | France | Sept. 4, 1952 |
| 65,850 | France | Nov. 16, 1955 |
| | (Addition to 1,090,586) | |
| 1,132,805 | France | Nov. 5, 1956 |
| 66,774 | France | Mar. 18, 1957 |
| | (Addition to 1,090,586) | |
| 1,216,366 | France | Nov. 30, 1959 |